United States Patent
Lettau (10) Patent No.: US 8,863,023 B2
(45) Date of Patent: Oct. 14, 2014

(54) SYSTEM AND METHOD FOR DISPLAYING INFORMATION USING A COMPASS

(75) Inventor: Ty Lettau, Hercules, CA (US)

(73) Assignee: Adobe Systems Incorporated, San Jose, CA (US)

( * ) Notice: Subject to any disclaimer, the term of this patent is extended or adjusted under 35 U.S.C. 154(b) by 987 days.

(21) Appl. No.: 12/325,767

(22) Filed: Dec. 1, 2008

(65) Prior Publication Data

US 2009/0083660 A1 Mar. 26, 2009

Related U.S. Application Data

(63) Continuation of application No. 11/374,890, filed on Mar. 13, 2006, now Pat. No. 7,461,345.

(60) Provisional application No. 60/660,729, filed on Mar. 11, 2005.

(51) Int. Cl.
| | |
|---|---|
| *G06F 3/048* | (2013.01) |
| *G01C 21/36* | (2006.01) |
| *G09B 29/10* | (2006.01) |
| *G06F 17/30* | (2006.01) |
| *G08G 1/0969* | (2006.01) |

(52) U.S. Cl.
CPC ............ *G09B 29/106* (2013.01); *G01C 21/367* (2013.01); *G01C 21/3673* (2013.01); *G06F 17/30241* (2013.01); *G08G 1/0969* (2013.01)
USPC ........... 715/784; 715/738; 715/848; 715/850; 715/851; 715/854; 715/855

(58) Field of Classification Search
CPC .................................................. G06F 17/30241
USPC .................. 715/848, 850, 851, 854, 855, 738
See application file for complete search history.

(56) References Cited

U.S. PATENT DOCUMENTS

| | | | | |
|---|---|---|---|---|
| 5,948,040 | A * | 9/1999 | DeLorme et al. | 701/201 |
| 5,951,621 | A * | 9/1999 | Palalau et al. | 340/995.2 |
| 6,346,938 | B1 * | 2/2002 | Chan et al. | 345/419 |
| 6,477,526 | B2 * | 11/2002 | Hayashi et al. | 707/4 |
| 6,493,630 | B2 * | 12/2002 | Ruiz et al. | 701/208 |
| 6,862,520 | B2 * | 3/2005 | Kamiya et al. | 701/538 |
| 6,868,337 | B2 * | 3/2005 | Muramatsu | 701/431 |
| 7,127,350 | B2 * | 10/2006 | Oikubo | 701/437 |
| 8,121,640 | B2 * | 2/2012 | Russ et al. | 455/556.1 |
| 8,196,060 | B2 * | 6/2012 | Tatehata et al. | 715/784 |
| 2002/0149586 | A1 * | 10/2002 | Maeda et al. | 345/440 |
| 2004/0174387 | A1 * | 9/2004 | Nonaka | 345/684 |
| 2005/0033511 | A1 * | 2/2005 | Pechatnikov et al. | 701/210 |
| 2005/0132305 | A1 | 6/2005 | Guichard et al. | |
| 2005/0192025 | A1 | 9/2005 | Kaplan | |
| 2005/0268254 | A1 * | 12/2005 | Abramson et al. | 715/855 |

(Continued)

OTHER PUBLICATIONS

Catling et al.; Road Transport Informatics in Europea Summary of Current Developments; © 1990; IEEE; 14 pages.*

*Primary Examiner* — Linh K Pham
(74) *Attorney, Agent, or Firm* — Shook, Hardy & Bacon L.L.P.

(57) ABSTRACT

A system and method displays a compass control with a map or other image. The compass control displays locations that may be displayed on the map, as well as locations that are outside of the map area being displayed, to allow the user to view such locations and interact with them.

33 Claims, 4 Drawing Sheets

(56) References Cited

U.S. PATENT DOCUMENTS

| | | |
|---|---|---|
| 2006/0022978 A1 | 2/2006 | Hoff |
| 2006/0190172 A1* | 8/2006 | Cross et al. ............... 701/213 |
| 2006/0229802 A1 | 10/2006 | Vertelney et al. |
| 2007/0042790 A1* | 2/2007 | Mohi et al. ............... 455/456.5 |
| 2007/0070066 A1 | 3/2007 | Bakhash |
| 2007/0070090 A1* | 3/2007 | Debettencourt et al. ...... 345/672 |
| 2007/0109297 A1 | 5/2007 | Borchardt et al. |

* cited by examiner

SYSTEM AND METHOD FOR DISPLAYING INFORMATION USING A COMPASS

RELATED APPLICATIONS

This application is a continuation of U.S. application Ser. No. 11/374,890, filed Mar. 13, 2006, now allowed and projected to issue as U.S. Pat. No. 7,461,345, which claims the benefit of U.S. Provisional Patent Application No. 60/660,729, entitled "Method and Apparatus for Displaying Information," filed Mar. 11, 2005, all of which are incorporated herein by reference.

FIELD

The present invention is related to computer software and more specifically to computer software for the display of information, such as maps.

BACKGROUND

Many Internet applications allow users to view a map of a geographic area. A user enters one or more locations, and the application displays the one or more locations on a map containing the one or more locations. Buttons around the periphery of the map allow the user to navigate in the direction of the button, and zoom in or out of the map.

Although maps received over the Internet are helpful, the user interface leaves much to be desired. For example, the buttons take up screen space that causes the map to have a size that is smaller than the available size of the user's computer screen. Second, when the user presses a button, the page reloads in a discontinuous fashion, for example, by suddenly displaying a zoomed in or zoomed out version of the map, causing the user to lose his or her orientation. The user is limited to moving in a direction corresponding to a button (for example, corresponding to North, East, West or South), requiring the user to zigzag around the map to move it into a position the user desires. The user is also required to move the map in the increments established by the author of the application: the user has no control over how far in the indicated direction the view of the map will move. Finally, when one or more of the locations the user specified move off the view of the map, the user has no idea where they have gone relative to the view of the map or how far away from that view they are.

What is needed is a system and method that can allow a map to be displayed at a size that does not require it to be shrunk to accommodate navigation buttons, that does not cause a page reload when the user presses a button, that provides a wide range of motion both in terms of direction and distance moved, and can indicate where locations not being displayed on the map are relative to the map, and their distance from the view of the map.

SUMMARY

A system and method displays a compass user interface control that can be used to navigate a map or other surface in which the entire surface that can be displayed is not displayed on the screen at once. The compass may indicate certain reference points (e.g. 'N', 'S', 'E', 'W') corresponding to the directions in which the user may navigate the view of the surface, but the user is not limited to movement of the view in that direction. A needle (similar to a compass needle) in the compass responds to the user's mouseover of the compass, indicating the direction from the center of the compass to the mouse cursor, and when the user clicks the mouse during such a mouseover, the view of the map moves in the direction of the compass needle relative to the center of the map.

The movement of the view is animated in small increments so that the movement appears to be part of a motion, occurring as long as the user continues to hold down the mouse button. The further away from the center of the compass the user clicks, the faster the movement occurs.

Zoom in and zoom out buttons are optionally provided on the compass control near the compass, allowing the user to zoom in and out of the map, with the display updated in an animated fashion, as described below.

Certain locations may be designated, for example, by the user, and some or all of the locations are initially displayed on the map. The locations are also displayed on the compass, initially in the same approximate relative positions to one another, and the same relative position to the center of the compass as they have to the center of the map. As the user moves the view of the map or zooms in or out, the position of the locations are updated on both the map and the compass. Locations displayed at the edge of the current view of the map are displayed at the edge of the compass. Locations displayed on the compass are constrained to maintain their centers not farther out than the edge of the compass, though they remain displayed along the line having the same angle relative to a vertical line through the center of the compass that the location has on the map, relative to a vertical line through the center of the map. Thus, as locations move off the display of the map, they remain on the edge of the compass. If the user clicks on one of the locations on the compass, the map is reoriented at its current zoom level to display the clicked on location in the center of the map. The compass is updated to correspond to the map as described above.

For locations constrained to the edge of the compass, the color, size, or transparency of the icon corresponding to the location displayed on the compass indicates the distance the location has from the center of the map. The further away from the center of the map the corresponding location is from the center of the map, the lower the alpha, (i.e. the greater the transparency) (or size or intensity of color or depth of color) of the location displayed on the compass (with the location not displayed on the map in one embodiment). In another embodiment, the location may be displayed on the edge of the map in the same manner as it is displayed on the compass as described above.

The system and method initially obtains from a server blocks of the map described above, starting with the map at the zoom initially displayed, with areas around the initial view of the map being included in the map. The system and method displays only the portion of the map being initially displayed but pans the portion of the map viewed according to the user's compass commands. As the user moves near an edge, the coordinates of the edge of the map in the trajectory of the user may be provided to the server and the server responds with another portion of the map having an edge at that point. The system and method stitches the new map to the one being displayed to allow the user continue to change the view of the map.

The user can zoom in or out using buttons, such as at locations near the compass or nearby the map, and the system and method zooms in and out of the map it retrieved, by enlarging a view in the center of the map to zoom in, or shrinking the view and adding to the display portions of the map at the periphery of the former view. When the map is zoomed in, details such as certain street names (e.g. the names of major streets are displayed at one zoom level, and major and minor streets are displayed at another zoom level, with an optional intermediate step displaying the names of intermediate streets in between) and/or the illustration on the map of the streets themselves, may be added by the system and method, such details being retrieved from a server upon receipt of the zoom in command, or having been received with, or after the map is received, and added to the display as a result of the zoom in command. If the user presses the zoom out button, the formerly displayed map is shrunk, the areas around the formerly displayed map are displayed with the same relative zoom, and some of the detail, such as street names and illustrations of streets, disappears. As the user continues to zoom out, more and more of the details disappear.

As the user zooms in and out, or moves the map around as described above, the locations displayed on the compass are adjusted by the system and method so that they appear consistently with the map, as described above. Although the locations on the compass may be displayed with a consistent size from one zoom level to the next, the position of the displayed locations relative to the center of the compass may change in accordance with the positions relative to the center of the map, as described above. All movements and zooms are animated, so that the user appears to be "flying" over the map in a helicopter, rather than the page updates of conventional methods.

The description above is related to maps. However, the system and method of the present invention can apply to any type of information, such as another image, and or its navigation, such as the navigation of a human body, navigation of information on a network map, etc.

DETAILED DESCRIPTION

Figure 1:
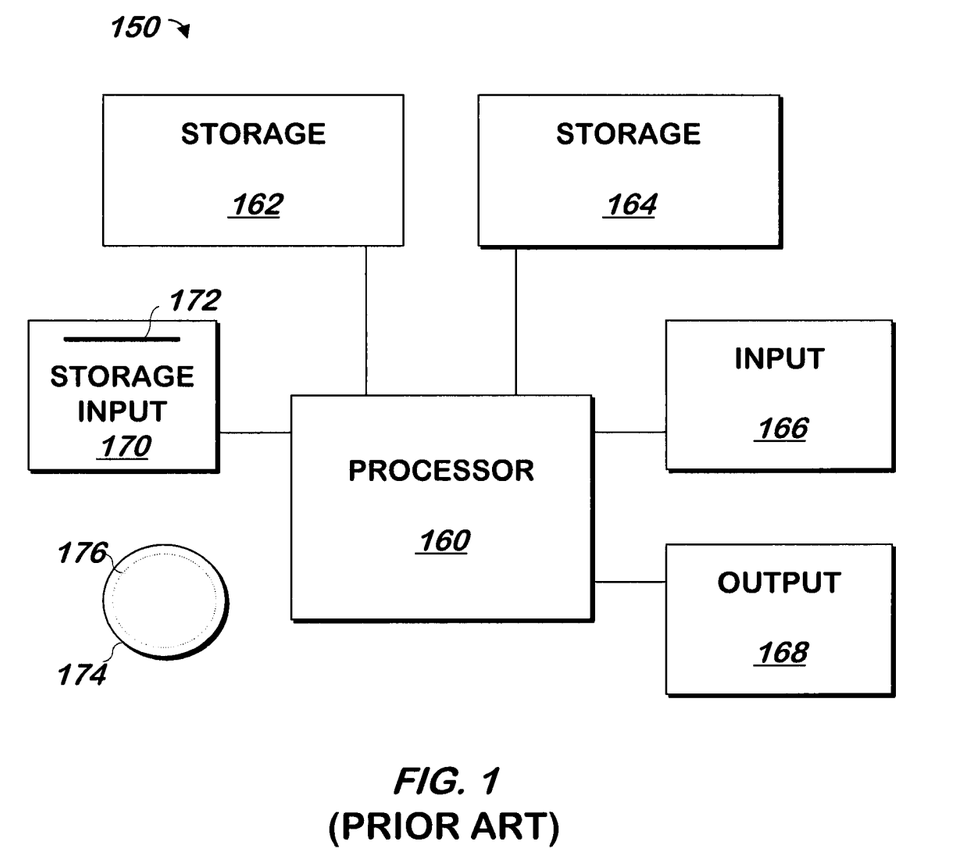
FIG. 1 is a block schematic diagram of a conventional computer system.

The present invention may be implemented as computer software on a conventional computer system. For example, the present invention may be implemented as a Flash Actionscript program for the Flash Player Plug-In to conventional browsers commercially available from Adobe Systems, Inc., of San Jose Calif. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Receive Request for a Map to be Displayed.

Figure 2:
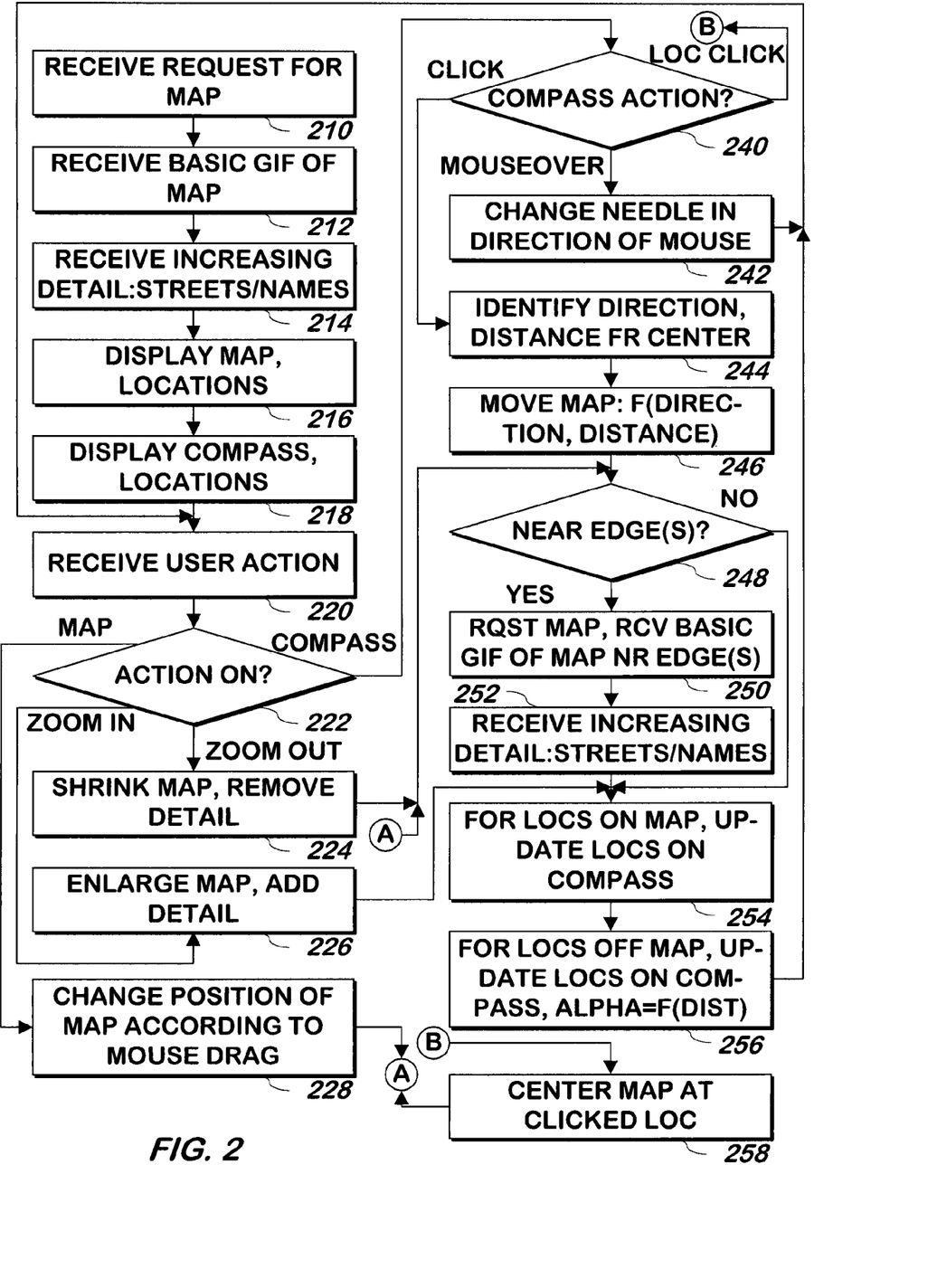
FIG. 2 is a flowchart illustrating a method of displaying information according to one embodiment of the present invention.

FIG. 2 is a flowchart illustrating a method of displaying information according to one embodiment of the present invention. Referring now to FIG. 2, a user request is received 210 for a map to be displayed. In one embodiment, the map request is received as one or more locations clicked on a map or one or more locations typed into a text field. A location may be a specific address, a landmark, a city name or any other form of location. The request may be received via a browser, and via a plug in to the browser, such as by the conventional Flash Player Plug in to conventional browsers commercially available from Adobe Systems, Inc., of San Jose Calif. Any other conventional method of requesting a map may be received.

Receive Basic GIF of Map.

A the user requested map is requested, e.g. from a server, and a basic GIF of the map is received 212. GIFs are used to communicate map information as described herein, however other embodiments may employ other formats, such as a set of vectors and other information, such as is found in conventional graphics programs, such as the conventional Flash .swf format. To request the map from the server, in one embodiment, the one or more locations received in step 210 are provided to the server, and the server responds with a square or rectangular map containing the locations specified. In one embodiment, the map will be the minimum size map that has all of the locations specified, plus a threshold amount of additional area. If a location is a city name, the entire city may be considered to be the location and the map will contain the entire city, or a portion thereof, such as a downtown.

In one embodiment, the map received from the server consists of one or more "blocks" of maps, each of which is identified by the map coordinates of the upper left-corner of the map block and the lower-right corner of the map block, and the server provides these coordinates with each block. The coordinates are used to display each block in its proper orientation relative to the other blocks as described in more detail below. Other means of providing a map may also be provided.

The basic GIF of any map block is an image of the map block that contains the basic details that would be displayed at a threshold zoom level. As noted below, additional details may be displayed at other zoom levels, and such details are provided as described below. Although a GIF is specified, other embodiments may use other forms of images, or graphics, such as a Flash movie file, PDF or other form of image.

Receive Increasing Detail (i.e. Streets, Names).

Additional map details are received 214. In one embodiment, the more basic map details are received before higher level map details are received, and the map details may be received with an indication of the detail level to which they correspond. For example, the locations and names of major streets may be received as level zero details, followed by the locations and names of more minor streets, which are received as level one details, and so forth. In one embodiment, map details are received associated with the identifying coordinates, described above, for the map block to which they correspond. In one embodiment, the additional map details are received as a GIF file that, when overlaid over the basic GIF (and the GIFs of lower level details) provides the additional detail that can be displayed on a map.

Display Map and Locations.

The received map and the appropriate level of received map details are displayed 216. To display the map and the map details, the basic GIF of the map may be displayed first, followed by more precise details, such as the location and names of smaller streets, according to the current zoom level of the map. The zoom level of the map may be changed as described below, and if not changed, a default value may be used.

As noted above, the details arrive in a certain order, and the details may be updated on the map as the details are received, for example by overlaying each GIF as it is received up to the level of details appropriate for the zoom level. In one embodiment, level zero details may be received and displayed before level one details are displayed, or level zero details may be received and displayed as level one details are being received. In one embodiment, if the requested map encompasses a large area, the amount of detail displayed may be less than the amount of detail displayed for a map which encompasses a smaller area. If the requested map includes two or more distinct locations, the size of the locations, or the distance between the locations, may determine the size and the detail of the initially displayed map. For example, if the scale of the map is large, some of the more precise details received may not be displayed.

Display Compass and Locations.

A compass is displayed, and any location or locations requested in step 210 are represented with an icon, such as a label or other identifier on the compass 218. In one embodiment, as described in more detail below, the compass is displayed as a conventional round compass with standard directional compass points (e.g. 'N', 'S', 'E', 'W') and a needle is optionally displayed, similar to a compass needle. The compass may be displayed in the same window as the map or in a different window. The compass may be displayed over the map, such as over a corner of the map. If the compass is displayed in the same window, and over the map, the map may be provided by the server 306 to at least initially not have any of the locations in the area on the map that is obscured by the compass. In one embodiment, the map window takes up the entire screen display and the compass is optionally displayed in a separate window that floats over the map window.

As described in more detail below, icons for certain locations may be displayed on the compass or at its edges. The icons may be displayed as letters ("A", "B", etc.), with each icon being displayed differently from the other icons.

In one embodiment, for locations that are included in the current map display, the icons for the locations are displayed on the compass in the same distance and direction relative to the center of the compass as the locations are displayed on the map relative to the center of the map. Icons at the portion of the edge of the displayed area of the map nearest to the center will be displayed at the edge of the compass, and in another embodiment, icons at the corners of the displayed portion of the map are displayed at the edge of the compass. For locations that are further from the center of the displayed map than these locations, and for locations outside of the current map display, the icon corresponding to the location on the compass display may be displayed on the edge of the compass, with an indication of the distance of the location from the center of the current map display. In one embodiment, the distance indication may be illustrated by the size or color or transparency of the icon corresponding to the requested location. For example, the icon for a requested location outside of the current map display may diminish in size, or change color, or become more and more transparent as the represented location (which is not displayed on the map in one embodiment) moves farther away from the center of the current map display.

Figure 4:
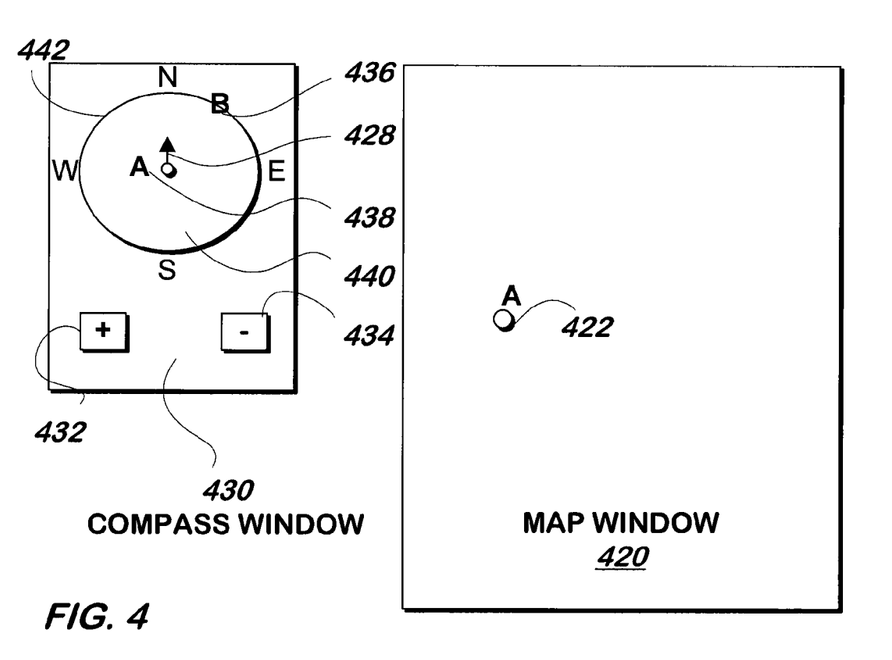
FIG. 4 is a diagram illustrating a screen shot of a representative map and compass display according to one embodiment of the present invention.

In one embodiment, the map and compass may be displayed in a manner similar to that shown in FIG. 4. FIG. 4 is a diagram of a screen shot of a representative map and compass according to one embodiment of the present invention. Referring now to FIG. 4, compass window 430 may be displayed alongside map window 420 in the same window in such as way as to be unobtrusive to map window 420, or compass window 430 may be displayed in a separate window from map window 420, for example, in a window that floats on top of the map window 420 in which the map is displayed. In one embodiment, compass window 430 includes compass 440, zoom in button 432, zoom out button 434 and one or more icons 438, such as labels, corresponding to locations that can be displayed on the map. Map window 420 includes the map (not shown) and any icons corresponding to locations. In one embodiment, each icon displayed on the map that corresponds to a location is similar or identical to the icon for that same location displayed on or adjacent to the compass 440, for example, using the same letter, though of a different size, color, or opacity.

Icon 438, described above, for a location included on the current map window 420 may correspond in direction and distance from the center of compass 440 to the direction and distance of the corresponding specified location 422 from the center of the map being displayed in map window 420. Icon 438, described above, for a requested location that is not included in the current map displayed in map window 420 may be displayed on the edge 442 of compass 440 in compass window 430 with an indication of the distance of the represented location from the center of the current map displayed in map window 420, as described above. In one embodiment, needle 428, which may look like an arrow, points outward from the center of compass 440, like a conventional compass needle. Buttons such as zoom out button 432 and zoom in button 434 may be displayed below compass 440 as part of compass window 430, and in the same operating system window as the compass.

Receive User Action.

Referring again to FIG. 2, a user action is received 220. In one embodiment, the user action is received from an operating system in response to the user manipulating a mouse or keyboard. User actions may include moving the mouse over the compass or map window, or manipulating a control or icon on the map or compass window using a conventional computer mouse or keyboard. Such manipulations may include, for example, clicking a zoom out button on the compass window, clicking a zoom in button on the compass window or dragging the mouse to move the map. Other manipulations may include clicking on a label on the compass to center the map to the corresponding location or mousing over the compass as described in more detail below.

Shrink Details on Map and Remove Detail.

Referring now to FIGS. 2 and 4, if the user action is received as a request to zoom out on the map 222, for example, if a mouse click is received on the zoom out button 434 of the compass display, the area displayed on the map display 420 is broadened, and some or all of the more precise details may be removed from the area displayed on the map 224 in accordance with the resulting zoom level of the map. In one embodiment, if the user presses the zoom out button, or otherwise indicates that a zoom out operation is requested, the formerly displayed map block or blocks, or portions of a map block or blocks, are shrunk, and areas adjacent to the formerly displayed map block or blocks are added to the displayed map in the map window with the same new relative zoom. Some of the detail, such as the locations and names of streets, may disappear. As the user continues to zoom out, more and more of the detail may disappear. As described below, sufficient portion of the map around the area being displayed may be maintained in memory before it is needed, to allow the zoom out to occur without the need to wait to download the portions of the map that would be newly displayed after the zoom out. In one embodiment, as the displayed portion of the received map approaches any edge of the received map (consisting of all of the received map blocks, additional map blocks are requested and received as described in more detail below.

In one embodiment, any changes to the display of the map, including, but not limited to, the zoom out now being described, are animated so that the user appears to be "flying" over the map, minimizing the disorientation of a discontinuous page update, as used in prior art methods. A page update is thus not used to change the display of the map or compass windows in one embodiment of the present invention, although in other embodiments, a page update is used to so change the display. The method continues at step 248.

It is noted that the user may hold down the zoom out button (or the zoom in button described below), which may be treated as if the user had repeatedly clicked such held-down button.

Enlarge Details on Map and Add Detail.

If the user action is click of a zoom in button 432 on the compass display being clicked 222, the portion of the map block or blocks displayed in the map window is made smaller, the size of details displayed on the map window may be increased, and more details may be added to the map display 226 in accordance with the new current zoom level. For example, if the user presses the zoom in button, or otherwise indicates that a zoom in operation is requested, the center of the map is enlarged, details such as the locations and names of streets may be enlarged, and additional details, such as the locations and names of more minor streets not previously displayed, may be displayed on the map display. As the user continues to zoom in, more and more precise detail may be added and such operation may be quickly repeated if the user holds down the mouse button. The method continues at step 254.

Change Position of Map According to Mouse Drag.

If the user action is received as request to move the map 222, for example by clicking and dragging on a point of the map window, the portion of the map coordinates displayed in the map window is changed according to the user request, and the change is animated as described above 228. To change the area of the map displayed in the map window according to the request received, the map may be repositioned corresponding to the user action. For example, a drag right causes the map to be repositioned to the right within the map window, with formerly displayed portions near the right edge no longer being displayed, and other portions not formerly displayed to the left of the displayed map being displayed.

Figure 5:
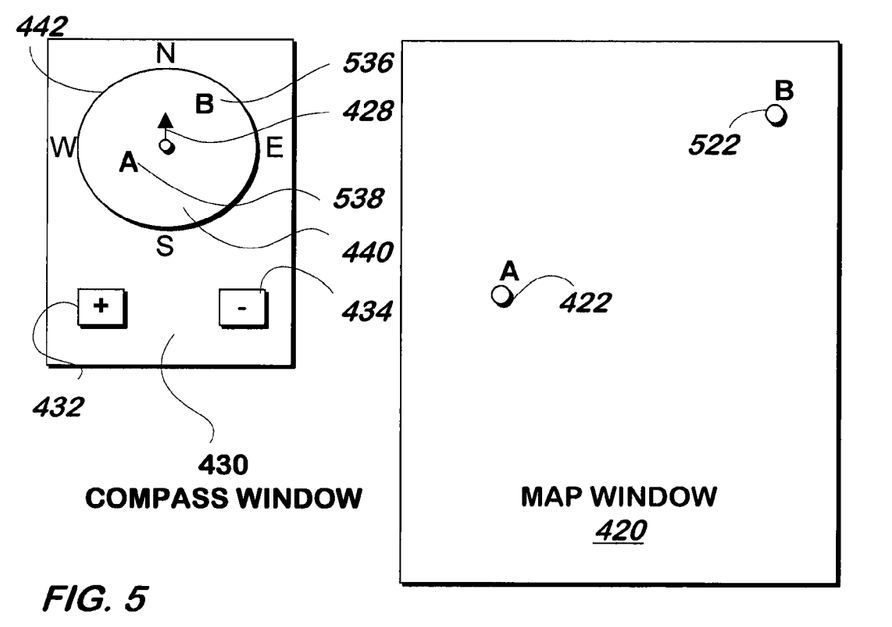
FIG. 5 is a diagram illustrating a screen shot of the map and compass display of FIG. 4 after the map has been moved by the user according to one embodiment of the present invention.

FIG. 5 illustrates the screen display of FIG. 4 after the user has dragged the map down and to the right. Referring now to FIGS. 4 and 5, location 522 (with an icon, or label, of "B") appears in the map window 420, having been up and to the left of the map window 420, and therefore not displayed in the map window of FIG. 4. The corresponding icon 436 on the compass 440 has been moved into position 536 to indicate its location on the map window 420, and icon 538 has been moved into position 538 to indicate its updated location on map window 420. If a user were to drag the map of FIG. 5 back to the position of FIG. 4, the map window 420 and compass window 430 would be altered to appear as they do in FIG. 4, with the "B" icon moved off the map window 420, and "sticking" to the edge 442 of the compass 440, with an alpha value that increases or decreases as the location 522 moves further away from the center of the map window 420. It is noted that centers of the map window and compass window are described herein, though other references points near the center or far away from it may be used in other embodiments of the present invention.

Change the Needle of the Compass to Point in the Direction of the Mouse.

Referring again to FIGS. 2 and 4, The method continues at step 248. If the user action is received as a mouseover on the interior portion 440 of the compass, or a hovering of the pointer of the mouse over a point on the compass of the compass 240, the direction of the needle 428 of the compass may be adjusted. To adjust the direction of the needle of the compass, the point of the needle of the compass may be moved, with the opposite end of the needle remaining in the center of the compass, so that the needle points in the direction of a line extending from the center of the compass 240 to the location of the mouse cursor. The method continues at step 220.

Identify the Direction and the Distance from the Center of the Compass to a Second Point on the Compass.

If the user action is received as a mouse click on the compass display on a point of the compass that does is not on or near the icon of a location displayed on the compass as described herein 240, then the direction and the distance of the clicked point from the center of the compass 440 is identified 244.

It is noted that the direction is not a limited number of discrete directions as in conventional user interface controls. There may be more than 16 or 32 directions the user may specify by clicking on the compass. In one embodiment, the number of directions is limited only by the resolution of the mouse, or by ½, ¼, or ⅛ of such resolution or another fraction of such resolution. The directions are not limited by the display of the directions on the compass.

Shift the Display of the Map According to the Identified Direction and Distance.

The map is updated 246 by moving the center of the map being displayed in a direction and by a distance corresponding to the clicked point on the compass with the portion towards the direction being displayed in the map window, and other portions in the opposite direction no longer being displayed. As described herein, when a map is described as moved, repositioned, recentered, etc., it means the map in the map window is altered to show a different part of the map (as opposed to the map being moved on the display screen) the formerly displayed center of the map is moved, either to a location that is still displayed on the map display, or to a location off of the map display and therefore no longer displayed. The portion opposite the direction of movement is no longer displayed. The newly displayed portion and the formerly displayed portion show substantially the same amount of area of the map when the map is moved. Surrounding portions of the map will be received and displayed as described below to fill the area of the map display To update the map to correspond to the point clicked on the compass, the direction, and the distance from the center of the compass to the point clicked on the compass, are identified at step 244, and then those two pieces of information are used to determine the new center of the updated map in the map window. The center of the map being displayed is moved 246 in the direction of that identified, and the method continues at step 248. The distance the center is moved is made in proportion to the distance from the center of the compass the user clicks. If the user clicks a point on a line ⅓ from the center of the compass to its edge, the center of the map will be moved less than if the user clicks a point on the same line ⅔ from the center of the compass to the edge, though the direction of movement in both cases will be the same. The scale need not be linear: the movement of the center of the map if the point ⅔ of the distance from the center of the compass to the edge may be more than twice that which would occur if the point ⅓ of the distance from the center of the compass to the edge had been clicked. It is again noted that any changes to the display of the map may be animated as described above, though they need not be animated.

If the user holds down the mouse button a the point clicked, the map will continue to move in the manner described above. The movement will appear to be faster the farther from the center of the compass at which the user is holding down the mouse.

Center Map at Clicked Location.

If the user action is received as a mouse click on a representative label or other icon of a specified location on the compass display 240, the map display is re-centered, by manner of animation as described above, so that the to the specific location corresponding to the representative label or icon that has been clicked on the compass display is centered within the map display. The method continues at step 248.

Check Edges.

At step 248, a determination may be made whether any edge of the map displayed is approaching, or has reached or surpassed, any outer edge of the portion of the map that have been received. To make a determination whether the current map display is approaching, or has reached surpassed, one or more edges of the block or blocks that have been received, the distance from the edges of the currently displayed map to one or more edges of the received map or maps may be calculated, and if one or more of the distances falls below a given threshold, then map display is determined to be approaching, or reached or surpassed, one or more edges. For example, if the map display is moved to a point in the north-east corner of the northern-most eastern-most received map block, indicating that there is a limited amount of map information farther to the north, the east and the north-east; or if a request is received to display a point to the north-east that is not included in any received map block or blocks; then the map display may be determined to be approaching, or have reached or surpassed, the north edge, the east edge, the northeast edge, or all of the above, of the received map block or blocks.

Receive Basic GIF of Map Near Edge(s).

If the current map display is determined to be approaching, or to have surpassed, one or more edges of the received map block or blocks 248, the map of the block or blocks near the approached, or surpassed, edge or edges is requested and the basic GIF is received 250. The basic GIF of the map block or blocks near the approached, or surpassed, edge or edges is received in a manner at least similar to step 212. In one embodiment, when a new map block is received, the new map block may be incorporated seamlessly as part of the map blocks that have already received to form a continuous map image. If some or all of the requested block falls within the area of the map being displayed in the map window, step 250 includes displaying such portion or all of the requested block.

Receive Increasing Details of Map, Such as Smaller Streets and their Names.

More details corresponding to the newly received map block or blocks are received 252, for example the location and names of large streets, followed by the location and names of more minor streets, in a manner at least similar to step 214. In one embodiment, if such details are to be displayed because the newly received block or blocks are within the area of the map being displayed in the map window, the details corresponding to the new map block or blocks in the current map display are displayed as they are received, in a manner similar to step 216, up to the current zoom level, or level of detail displayed, of the current map display.

For Locations on the Map, Update Locations on Compass.

At step 254, for the specified location or locations that are included in the current map display, the position of the icon or icons representing the specified location or locations on the compass are updated on the compass to reflect the new position of the specified location or locations on the current map window. The positions may be identified relative at or near the center of the displayed portion of the map and the compass or at another point on the map and compass. The updated position of the label or labels representing the specified location or locations on the compass are displayed in a manner at least similar to step 218 and as described above.

For Locations Off the Map, Update Locations on Compass Such that Alpha=F(Dist).

For the specified location or locations that are no longer being displayed in the map window, the label or labels used to represent the specified location or locations on the compass display are displayed at the edge of the compass in the direction from the center of the compass corresponding to the direction of the specified location from the center of the current map display 256. Additionally, in one embodiment, as a specified location that is no longer a part of the current map display moves farther and farther away from the center of the current map display, the label used to represent the specified location on the edge of the compass display may be displayed on the edge of the compass in such a way as to indicate that increasing distance, for example by changing color, becoming smaller and smaller, or becoming more and more transparent. The method continues at step 220.

Figure 3:
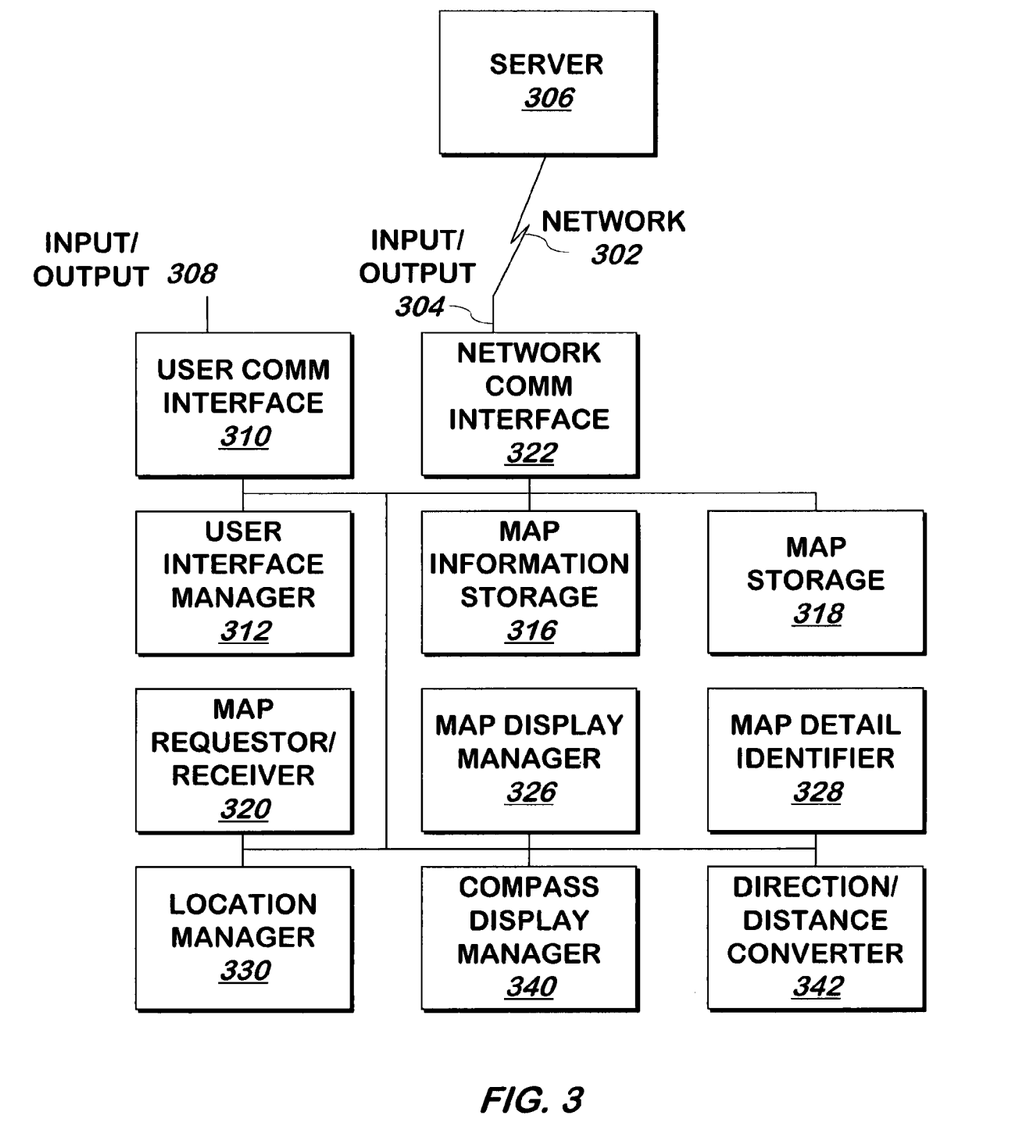
FIG. 3 is a block schematic diagram illustrating a system for displaying information according to one embodiment of the present invention.

FIG. 3 is a block schematic diagram illustrating a system for displaying information according to one embodiment of the present invention.

Referring now to FIG. 3, user interface manager 312 receives a request for a map to be displayed as described above. In one embodiment, user interface manager 312 receives the request via user communication interface 310, which may be coupled to a conventional keyboard, mouse and monitor via input/output 308. Communication interface 310 includes one or more conventional communication interfaces that have inputs coupled to a conventional mouse, keyboard or other input device, one or more outputs coupled to a monitor or other display devices. All user input is received, and user output is provided, via communication interface 310.

User interface manager 312 may receive the map request in a variety of ways, such as via a mouse click on a window containing a map or via location information, such as one or more addresses, typed into a text field with a keyboard, as described above. When user interface manager 312 receives the request for a map to be displayed, user interface manager 312 sends the information in the request (e.g. the addresses) to map requestor/receiver 320.

In one embodiment, user interface manager 312 may send map requestor/receiver 320 sets of locations that can be interpreted by a server to provide one or more map blocks as described above. For example if user interface manager 312 receives the map request as one or more typed addresses, user interface manger 312 may send the typed address or addresses to map requestor/receiver 320 for forwarding to the server. Other ways of receiving a request for a map may be employed by the present invention.

When map requestor/receiver 320 receives the locations or other information in the map request from user interface manager 312, map requestor/receiver 320 sends a request for the map corresponding to the information it receives, to server 306 via network communication interface 322, which may be coupled to a network 302 such as the Internet, via input/output 304. Network communication interface 322 includes a conventional TCP/IP-compatible Ethernet or other similar communication interface running conventional protocols such as Ethernet and TCP/IP or other conventional protocols. All network and server input/output is provided and received via network communication interface 322.

When server 306 receives the information from map requestor/receiver 320, server 306 identifies one or more blocks of a map corresponding to the information it receives and sends the identified map block or blocks to map requestor/receiver 320 via network communication interface 322. In one embodiment, server 306 sends a basic GIF of the requested map block or blocks, followed by more and more details corresponding to the map block or blocks, as described above.

In one embodiment, a map is made up of, or divided into, blocks of maps, and the map blocks are identified by the coordinates of the upper-left corner of the map and the lower-right corner of the map, although some of the coordinates may be implied and need not be sent if each block has a fixed size. Server 306 sends to map requestor/receiver 320 the basic GIF of each block and the increasing level of detail, along with the coordinates to adjacent blocks of maps to be stitched together, i.e. displayed as if they are continuous by physically orienting them according to the coordinates, for example, as described above, to form a continuous map of a larger area.

When map requestor/receiver 320 receives the basic GIF of the requested block or blocks, map requestor/receiver 320 stores the received block or blocks in map storage 318 as described above and signals map display manager 326 with the pointer to the basic GIF. The server will follow the basic GIF with blocks containing additional detail, the map coordinates of the block of additional detail (which are the same as the basic GIF to which the detail corresponds) and the detail level to which the detail corresponds. As additional detail is received, map requestor/receiver 320 stores it in map storage 318 associated with the basic GIF, each of the basic GIF and the detail, being received as a GIF. In one embodiment, map requestor/receiver 320 stores each received map block (either the basic GIF or the additional detail) associated with the set of coordinates corresponding to the block and the detail level of the GIF, and map requestor/receiver 320 stores the map blocks corresponding to the increasing details associated with the map block in order of the level of the detail, as described above. For example, map requestor/receiver 320 may store the most basic map details, such as the locations and/or names of major streets, designated as detail level zero details; a higher level of detail, such as the locations and/or names of more minor streets, as detail level one details; and even higher levels of detail as subsequent levels. In one embodiment, map requestor/receiver 320 may receive details corresponding to a map block or blocks concurrently as map display manager 326 updates the current map display, as described herein.

However, as noted above, when map requestor/receiver 320 has stored the basic GIF of the requested map block or blocks, associated with the map block identifier or identifiers in map storage 318, map requestor/receiver 320 signals map display manager 326 with a pointer to the start of the basic GIF. Thus, in one embodiment, while the additional detail is being received, map display manager 326 may display the corresponding basic GIF. Additional detail levels may be displayed while corresponding other detail levels are being received.

In one embodiment, server 306 will have marked any locations on the basic GIF, so map display manager 326 need not mark the locations on the map. However, in one embodiment, the coordinates of each location that had been provided to the server are received. These coordinates may employ the same coordinate system as the used by each map block so that the position of the locations relative to the displayed portion of the map may be identified as described below. Icons or labels or identifiers used by the server to identify the locations on the map are also provided with the coordinates of the locations for use as described below. Sever 306 provides map requestor/receiver 320 with such information about any locations before or after it provides the basic GIF, and map requestor/receiver 320 stores the information about the location or locations it receives in map information storage 316.

When map display manager 326 receives the signal from map requestor/receiver 320, map display manager 326 displays the map block or blocks corresponding to the requested map, as described above. As noted above, map display manager 326 may stitch together and display any number of adjacent blocks of maps to form a display of a continuous map of an area that covers more than one block.

To display the map, map display manager 326 first displays the basic GIF, then overlays on the existing displayed map image increasing levels of additional detail until it has provided all such levels appropriate for the current zoom level. The rendering of an additional layer of any level onto the currently displayed level may be performed in a separate area of memory and then swapped in place of the memory being displayed, or the rendering may be performed to the area of memory the operating system displays.

The zoom level may be specified by the user using user interface manager 312 as described in more detail below, and user interface manager stores the then current zoom level in map information storage 316, and map display manager 326 retrieves the zoom level from map information storage 316 prior to displaying the map. User interface manager 312 may store a default zoom level at system startup to allow the zoom level to be used to display the map if the user has not specified one. In one embodiment, the default zoom level is provided by the server with the basic GIF or another detail GIF in response to the map request. The server identifies the default zoom level that will enable all locations in the request (or all locations in all requests) to be displayed. When map requestor/receiver 320 receives the zoom level from the server, it stores it into map information storage 316 as the default zoom level.

To display the map, map display manager 326 defines a portal to the map by specifying the map coordinates of the upper left corner and the lower right corner of the portion of the map to be displayed. The portal coordinates define the portion of the map that is to be displayed. The size of the portal is selected according to the zoom level as described above, and the map corresponding to the portal coordinates is enlarged or shrunk to fill the map window when the map is displayed as described herein. To display the basic GIF or any GIF corresponding to a level of detail, map display manager 326 renders the portion of the map it has received that is within the portal it defined. Map display manager 326 stores the portal coordinates in map information storage 316. As noted above, the portion of the map provided by the server may contain a border area that map display manager will not initially display. In one embodiment, the initial portal coordinates are received from the server by map requestor/receiver 320, which stores it into map information storage 316. Map display manager 326 uses the portal coordinates whenever it displays the map as described herein.

When map display manager 326 has displayed the basic GIF of the map block or blocks corresponding to the requested map, map display manager 326 displays the details associated with the block or blocks of the displayed map up to the level appropriate for the zoom level. To determine the level of detail appropriate for the zoom level, map display manager 326 provides the zoom level it retrieves from map information storage 316 and provides it to map detail identifier 328. When it receives the zoom level, map detail identifier 328 looks up the corresponding detail level in a table it internally stores that converts the zoom level to a detail level, and provides the detail level to map display manager 326. Some zoom levels may share the same detail level in one embodiment.

When map display manager 326 receives the detail level of detail to display from map detail identifier 328, map display manager 326 adds the details associated with the displayed block or blocks within the portal coordinates to the map display up to the detail level received from map detail identifier 328, and map display manager 326 displays any specified locations on the map display, as described above. To display the detail GIFs, map display manager displays the portion of those GIFs within the portal coordinates in the same manner used to display the basic GIF. In one embodiment, map display manager 326 adds details corresponding to the current map display one level at a time up to the specified level of detail, as described above. When map display manager 326 has displayed the map block or blocks, or portion or portions of the map block or blocks map display manager 326 signals compass display manager 340.

When signaled, compass display manager 340 displays the compass control, including the compass, zoom in, and zoom out buttons, and displays the representative label or labels for the requested location or locations on the compass as described above. In one embodiment, compass display manager 340 displays the compass in a window separate from, and optionally, floating over, the window used to display the map, or the compass may be displayed in the same window as the map, either to one side or above a portion of the map. The window used to display the map may be the same window from which the map request is made, and the compass may be displayed either in a different window or the same window. In the embodiment in which a different window is used, if such window does not exist, compass display manager 340 requests it from an operating system (not shown).

In one embodiment, when signaled, compass display manager 340 signals location manager 330, which retrieves the coordinates corresponding to the one or more locations and their associated identifier or identifiers from map information storage 316, and uses the portal coordinates stored in map information storage 316 that describes the portion of the map being displayed to determine the position and alpha of each location according to where the location is displayed (or not displayed) on the display of the map as described above. In one embodiment, location manager 330 identifies the position of each location relative to the center of the window definition, and then assigns to each location a position relative to the center of the compass (for example, using 0,0 as the center of the compass, with a range of (0, 120) to (0,−120), or (120,0) to (−120,0), for example) that corresponds to the location relative to the center of the displayed portion of the map. Location manager 330 stores in map information storage 316, associated with each location coordinate and icon or identifier stored in map information storage, the position it assigns. As described above, each location having coordinates that are not within the window definition may be assigned a position at the edge of the compass (e.g. (0, 120) and also assigned an alpha value, to represent the opacity, color or size at which the icon corresponding to the location should be displayed. In one embodiment, location manager 330 stores the old positions of each location associated with the corresponding location to enable compass display manager 2340 to animate the movement of the location icons from their old positions to their new ones. When location manager 330 completes assigning the position and any alpha values to each location in map information storage 316, location manager 330 signals compass display manager 340.

When signaled, compass display manager 340 displays the compass, and the buttons used to zoom in or out, on the window it controls as described above. Compass display manager 340 displays the icon, identifier or other label for each specified location in map information storage 318 on the compass display as described above, using the position and alpha information assigned as described above.

In one embodiment, location of the icon for a specified location on the compass corresponds to the position of the specified location as it is displayed on the current map display, as described above, and any specified locations that are not currently displayed in the map window (i.e. within the coordinates of the portal) are displayed by compass display manager 340 on the outer edge of the compass portion of the compass display, as described above. The alpha of any such specified location not included in the current map window is determined by the distance from the center of the current map display to that specified location, as described above, and the alpha is displayed as a feature of the icon (e.g. label) of the specified location on the compass display as described above, either by changing the opacity, size, or color of the icon according to the alpha value.

In one embodiment, the window in which the compass is displayed may be designated by a different handle than the window in which the map is displayed, or the window in which the compass is displayed may the same window in which the map is displayed. For example, compass display manager 340 may display the compass in a corner of the window in which the map is displayed, or compass display manager 340 may display the compass in a separate window from the window in which the map is displayed.

At any time, user interface manager 312 may receive a user action via input/output 308 of user communication interface 310 and an operating system (not shown). In one embodiment, user interface manager 312 may receive a user action as a mouseover over one or more windows or as a mouse click or drag on one or more windows. When user interface manager 312 receives a user action, user interface manager 312 provides the action and window coordinates of the action to map display manager 326 or compass display manager 340. In one embodiment, if the window handle of the action corresponds to the handle of the map display window, user interface manager 312 provides the action and window coordinates to map display manager 326; and if the window handle of the action corresponds to the window in which the compass is displayed, user interface manager provides the action and window coordinates to compass display manager 340. In the embodiment in which both the compass and window are displayed in the same window, user interface manager 312 provides the action and window coordinates based on the location of the window coordinates within the window: if the window coordinates correspond to the compass control, user interface manager provides the action and window coordinates to compass display manager 340 and if the window coordinates correspond to the map, user interface manager provides the action and window coordinates to map display manager 326.

When map display manager 326 receives the action and window coordinates of the action from user interface manager 312, map display manager 326 identifies the action corresponding to the received action and window coordinates. In one embodiment, map display manager 326 may identify a mouse drag from a window coordinate corresponding to a displayed map coordinate as a request to change the display of the map.

If map display manager 326 identifies the user action as a request to move the map display, as described above, map display manager 326 updates the portal coordinates in map information storage 316 in accordance with the user action and animates and changes the map display an animation if movement from the former portal coordinates to the new of portal coordinates in the manner described above.

In one embodiment, if map display manager 326 determines that the current map display is near an edge or edges, or has surpassed an edge or edges, of the map blocks stored in map storage 318, as described above, map display manager 326 may signal map requestor/receiver 320 to request and receive more map blocks, near that edge or those edges in the manner described above. Map display manager 326 provides to map requestor/receiver 320 the coordinates corresponding to the edge of the map block or blocks that should be retrieved as described above and map requestor/receiver 320 retrieves an additional one or more blocks from server 306 via network communication interface 322 by providing the coordinates to the server 306.

Any time map display manager 326 has changed the display of the map in the window displaying the map as described above, map display manager 326 signals compass display manager 340.

When compass display manager 340 receives the signal from map display manager 326, compass display manager retrieves the portal coordinates from map information storage 316, and compass display manager 340 updates the icons on the compass display as described above. In one embodiment, as part of that process compass display manager 340 signals location manager 330, which uses the updated portal coordinates to determine the center of the map being displayed, retrieves the coordinates of the specified location or locations stored in map information storage 316, updates the positions as described above, and signals compass display manager 340. Compass display manager 340 updates then updates the display of the icons of the locations on the compass as described above, in one embodiment by animating the movement of the location icons. For example, location manager 330 may store the old positions with the locations in map data storage 316 to enable the animation to occur from the old positions to the new ones.

In one embodiment, to animate the movement of the compass location icons consistently and at the same time as the map is being moved, the process of moving view of the map from the former portal coordinates to the newly-identified portal coordinates and updating the position of the location icons on the compass is performed as described above, but the map and compass are altered a little bit at a time. Map display manager 326 internally stores the newly-identified portal coordinates instead of initially storing them in map information storage 316, and alters the portal coordinates in map information storage 316 by a small amount in the direction of the internally stored portal coordinates, redisplays the map window, in accordance with the portal coordinates stored in map information storage 316, and signals compass display manager 340 which updates the location icons on the compass as described above. Map display manager 326 then alters the portal coordinates in map information storage 316 by another small amount in the same direction and repeats the process until the portal coordinates stored in map information storage 316 match the internally stored portal coordinates and the map and compass have been updated.

At any time user interface manager 312 may continue to receive user actions from user communication interface 310, and user interface manager 312 may continue to send the action and window coordinates to either map display manager 326 or compass display manager 340 as described above.

When compass display manager 340 receives an action and the window coordinates of the action from user interface manager 312, compass display manager 340 identifies a request corresponding to the received action. In one embodiment, compass display manager 340 identifies a mouse click on window coordinate corresponding to a zoom out button as a zoom out request, as described above. Compass display manager 340 identifies a mouse click on a window coordinate corresponding to a zoom in button as a zoom in request, as described above. Compass display manager 340 identifies a mouseover on the compass display as a mouseover event, as described above. Compass display manager 340 identifies a mouse click on a window coordinate corresponding to a window coordinate at which a location icon or label is not displayed as a request to move the view of the map, as described above. Compass display manager 340 identifies a mouse click on a window coordinate corresponding to a window coordinate at or near a location icon or label is displayed as a request to center the map at that location, as described above.

If compass display manager 340 identifies the action as a zoom out request, compass display manager 340 retrieves the zoom level from map information storage 316, decrements it (if it is above the minimum zoom out level, and otherwise, does not decrement it), and signals map display manager 326 to redisplay the map.

Similarly, if compass display manager 340 identifies the action as a zoom in request, compass display manager retrieves the zoom level from map information storage 316, increments it (if it is below the maximum zoom out level, and otherwise, does not increment it), and signals map display manager 326 to redisplay the map.

In the case of a zoom in request or a zoom out request, the old zoom level may be stored separately in map information storage 316 by compass display manager 340 to allow the animation to occur as described herein.

When map display manager 326 receives the signal from compass display manager 340, map display manager 326 obtains from map detail identifier 328 the detail level corresponding to the current zoom level as described above, shrinks or enlarges the portal coordinates to correspond to the new zoom level, and, if the edge of the retrieved map is within the threshold distance from the displayed part of the map as defined by the portal coordinates, causes an additional one or more blocks to be retrieved as described above. Map display manager 326 animates the map with the appropriate level of detail from the old zoom level to the current zoom level as described above, and signals compass display manager 340, which animates the changes in location from the old portal coordinates to the new ones. When it animates a zoom in or out, map display manager 326 will maintain the area in which the map is displayed, but will enlarge or reduce the map so that the area of the map defined by the portal coordinates fills the area in which the map is displayed in map window 420.

In such embodiment, map display manager 326 may separately store the old portal coordinates in map information storage 316 to allow the animation to take place. In another embodiment, map display manager 326 may alter the portal coordinates in map information storage 316 a little at a time from the old portal coordinates to the new ones, animate the map in accordance with the altered coordinates, signal compass display manager 340 to update the position of the location icons on the compass display in accordance with the portal coordinates in map information storage, and repeat the process until the portal coordinates stored in map information storage 316 correspond to the new zoom level and the map and compass are updated in accordance with those portal coordinates.

If compass display manager 340 identifies the action as a mouseover request, compass display manager 340 changes the needle display of the compass display to point in the direction of the coordinates of the mouse, as described above.

If compass display manager 340 identifies the action as a mouse click on coordinates of the window corresponding to a coordinate of the compass that does not correspond to the map coordinates of a specified location, compass display manager 340 identifies the direction and distance of the clicked window coordinate from the center of the compass display. When compass display manager 340 has determined the compass direction and compass distance of the clicked window coordinate from the center of the compass display, compass display manager 340 sends the compass direction and compass distance to direction/distance converter 342.

When direction/distance converter 342 receives the compass direction and compass distance from compass display manager 340, map direction/distance converter 342 converts the compass direction and compass into map coordinates. In one embodiment, direction/distance converter 342 retrieves the portal coordinates from map information storage 316, and uses the coordinates to calculate new portal coordinates corresponding to the received compass direction and compass distance relative to the current map display. When direction/distance converter 342 has converted the compass direction and compass distance into new portal coordinates, direction/distance converter 342 stores the portal coordinates into map information storage 316 and signals compass display manager 340, which signals map display manager 326, which redisplays the map in an animated fashion and signals compass display manager 340, which updates the locations on the compass control in an animated fashion as described above. In one embodiment, instead of altering the portal coordinates with the coordinates it identifies, direction/distance converter 342 stores the new portal coordinates into a separate area of map information storage 316 and compass display manager 340 signals map display manager 326 to move the map in the direction of the coordinates in the special area of map information storage 316. When signaled, map display manager 326 alters the portal coordinates in the direction of the coordinates in the special area a little at a time, updating the map each time and signaling compass display manager 340 each time so that the animation of the map and the compass occurs in synchronization until the portal coordinates match those in the special area of map information storage 316. As the map display is updated as described herein, map display manager 326 checks the distance between the edge of the displayed map and the edge of the received map, and if it is within the threshold distance, initiates the retrieval of one or more additional blocks as described above.

If compass display manager 340 identifies the user action as a request to re-center the map at a location, compass display manager 340 uses the mouse coordinates to locate the position of the location indicated by the user and retrieves from map information storage 316 the map coordinates of the specified location. Compass display manager 340 provides the coordinates to map display manager 326 with an indication to center the map at that location.

When map display manager 326 receives map coordinates, map display manager 326 alters the portal coordinates to cause them to be centered around the coordinates it receives, animates the display of the map to center the map to the new portal coordinates, and signals compass display manager 340, as described above. The alteration of the portal coordinates may be performed a little at a time, with map display manager 326 updating the map and signaling compass display manager 340 to update the locations on the compass each time so that the map and compass move in synchronization as described above. As it alters the display of the map, map display manager 326 initiates the retrieval of additional map blocks if the edge of the displayed map is within the threshold distance of the edge of the retrieved map as described above.

What is claimed is:

1. A computer-implemented method, comprising:
    displaying a portion of an electronic representation of a surface in a display area of a display device, to provide a view of the electronic representation;
    receiving a selection of a point on a displayed user interface control; identifying a direction and a distance of the selected point from a reference point on the user interface control;
    in response to the received selection, changing the view of the electronic representation to display a different portion of the electronic representation in the display area based on the identified direction and distance;
    displaying, on the user interface control, an icon representing a location on the surface out of the view, the location having an orientation relative to the displayed view indicated by a position of the icon on the user interface control, and the location having a distance from the displayed view indicated by at least one of a color, a size and a transparency of the icon; and
    in response to a selection of the icon, changing the view of the electronic representation to include the location represented by the icon.

2. The method of claim 1, wherein the user interface control is displayed in a display area that is distinct from the display area in which the electronic representation is displayed.

3. The method of claim 2, wherein the display area in which the user interface control is displayed is included within the display area in which the electronic representation is displayed.

4. The method of claim 1, wherein the electronic representation comprises a map and wherein the portion of the electronic representation comprises a portion of the map.

5. The method of claim 4, wherein the user interface control comprises a compass user interface control having a selectable surface.

6. The method of claim 1, wherein changing the view of the electronic representation comprises:
   initiating requests for additional information to display in the display area as the view of the displayed electronic representation in the display area is changing.

7. The method of claim 1, further comprising:
   displaying a first icon in the display area;
   displaying, on the user interface control, a second icon related to the first icon; and
   changing the display of the second icon on the user interface control when changing the view of the electronic representation in the display area.

8. The method of claim 7, wherein displaying the second icon comprises:
   displaying the second icon at a position on the user interface control relative to a reference point in a display area in which the user interface control is displayed, the relative position of the second icon corresponding to a position of the related first icon relative to a reference point in the display area in which the portion of the electronic representation is displayed.

9. The method of claim 1, wherein identifying a direction of the selected point from the reference point on the user interface control comprises:
   identifying one of multiple different available directions from a center of the user interface control.

10. The method of claim 1, wherein the reference point is a center of the user interface control, and wherein changing the view of the electronic representation comprises:
    increasing a speed at which the view of the representation changes as the identified distance of the selected point from the center of the user interface control increases.

11. The computer-implemented method of claim 1, wherein the identified direction is one of a number of selectable directions, the number being a fraction of a resolution of an input device used to select the selected point on the displayed user interface control.

12. A system, comprising:
    a processor; and storage, coupled to the processor, including executable instructions for performing operations comprising:
    displaying a portion of information in a display area of a display device, to provide a view of the information;
    receiving a selection of a point on a displayed user interface control;
    identifying a direction and a distance of the selected point from a reference point on the user interface control;
    in response to the received selection, changing the view of the information to display a different portion of the information in the display area based on the identified direction and distance;
    displaying, on the user interface control, an icon representing a location in the information out of the view, the location having an orientation relative to the displayed view indicated by a position of the icon on the user interface control, and the location having a distance from the displayed view indicated by at least one of a color, a size and a transparency of the icon; and
    in response to a selection of the icon, changing the view of the information to include the location represented by the icon.

13. The system of claim 12, wherein the user interface control is displayed in a display area that is distinct from the display area in which the information is displayed.

14. The system of claim 13, wherein the display area in which the user interface control is displayed is included within the display area in which the information is displayed.

15. The system of claim 12, wherein the information comprises a map and wherein the portion of the information comprises a portion of the map.

16. The system of claim 15, wherein the user interface control comprises a compass user interface control having a selectable surface.

17. The system of claim 12, wherein changing the view of the information comprises:
    initiating requests for additional information to display in the display area as the view of the displayed information in the display area is changing.

18. The system of claim 12, wherein the operations further comprise:
    displaying a first icon in the display area;
    displaying, on the user interface control, a second icon related to the first icon; and
    changing the display of the second icon on the user interface control when changing the view of the information in the display area.

19. The system of claim 18, wherein displaying the second icon comprises:
    displaying the second icon at a position on the user interface control relative to a reference point in a display area in which the user interface control is displayed, the relative position of the second icon corresponding to a position of the related first icon relative to a reference point in the display area in which the portion of the information is displayed.

20. The system of claim 12, wherein identifying a direction of the selected point from the reference point on the user interface control comprises:
    identifying one of multiple different available directions from a center of the user interface control.

21. The non-transitory computer readable medium of claim 20, wherein identifying a direction of the selected point from the reference point on the user interface control comprises:
    identifying one of multiple different available directions from a center of the user interface control.

22. The system of claim 20, wherein the reference point is a center of the user interface control, and wherein changing the view of the information comprises:
    increasing a speed at which the view of the information changes as the identified distance of the selected point from the center of the user interface control increases.

23. The system of claim 12, wherein the reference point is a center of the user interface control, and wherein changing the view of the information comprises:
    increasing a speed at which the view of the information changes as the identified distance of the selected point from the center of the user interface control increases.

24. The system of claim 12, wherein the identified direction is one of a number of selectable directions, the number being a fraction of a resolution of an input device used to select the selected point on the displayed user interface control.

25. A non-transitory computer readable medium storing a computer program, the computer program including instructions that, when executed, cause at least one processor to perform operations comprising:
  displaying a portion of information in a display area of a display device, to provide a view of the information;
  receiving a selection of a point on a displayed user interface control;
  identifying a direction and a distance of the selected point from a reference point on the user interface control;
  in response to the received selection, changing the view of the information to display a different portion of the information in the display area based on the identified direction and distance;
  displaying, on the user interface control, an icon representing a location in the information out of the view, the location having an orientation relative to the displayed view indicated by a position of the icon on the user interface control, and the location having a distance from the displayed view indicated by at least one of a color, a size and a transparency of the icon; and
  in response to a selection of the icon, changing the view of the information to include the location represented by the icon.

26. The non-transitory computer readable medium of claim 25, wherein the user interface control is displayed in a display area that is distinct from the display area in which the information is displayed.

27. The non-transitory computer readable medium of claim 26, wherein the display area in which the user interface control is displayed is included within the display area in which the information is displayed.

28. The non-transitory computer readable medium of claim 25, wherein the information comprises a map and wherein the portion of the information comprises a portion of the map.

29. The non-transitory computer readable medium of claim 28, wherein the user interface control comprises a compass user interface control having a selectable surface.

30. The non-transitory computer readable medium of claim 25, wherein changing the view of the information comprises:
  initiating requests for additional information to display in the display area as the view of the displayed information in the display area is changing.

31. The non-transitory computer readable medium of claim 25, wherein the operations further comprise:
  displaying a first icon in the display area; displaying, on the user interface control, a second icon related to the first icon; and
  changing the display of the second icon on the user interface control when changing the view of the information in the display area.

32. The non-transitory computer readable medium of claim 31, wherein displaying the second icon comprises:
  displaying the second icon at a position on the user interface control relative to a reference point in a display area in which the user interface control is displayed, the relative position of the second icon corresponding to a position of the related first icon relative to a reference point in the display area in which the portion of the information is displayed.

33. The non-transitory computer readable medium of claim 25, wherein the identified direction is one of a number of selectable directions, the number being a fraction of a resolution of an input device used to select the selected point on the displayed user interface control.

* * * * *